United States Patent [19]

Muller

[11] 4,080,700

[45] Mar. 28, 1978

[54] METHOD OF ATOMIZING A LIQUID, AN ATOMIZER TIP FOR USE IN THE METHOD AND METHOD OF MANUFACTURING THE TIP

[75] Inventor: William C. Muller, Harvard, Mass.

[73] Assignee: Brunswick Corporation, Skokie, Ill.

[21] Appl. No.: 646,533

[22] Filed: Jan. 5, 1976

[51] Int. Cl.² .................. B23P 15/16; B23P 17/00
[52] U.S. Cl. .................. 29/157 C; 29/417; 29/423; 239/567
[58] Field of Search .......... 29/157 C, 156.8 H, 423, 29/417, 163.5 R, DIG. 47; 72/253, 254; 239/567, 566, 568, 596, 601

[56] References Cited

U.S. PATENT DOCUMENTS

| | | | |
|---|---|---|---|
| 1,958,038 | 5/1934 | Fraser | 239/596 |
| 2,254,757 | 9/1941 | Smith | 29/157 C |
| 2,423,203 | 7/1947 | Oldham | 29/157 C |
| 3,045,328 | 7/1962 | Turner et al. | 29/156.8 H |
| 3,296,850 | 1/1967 | Fiore | 29/163.5 R |
| 3,506,885 | 4/1970 | Roberts et al. | 361/433 |
| 3,713,202 | 1/1973 | Roberts et al. | 29/157 C |
| 3,716,902 | 2/1973 | Pearce | 29/417 |

FOREIGN PATENT DOCUMENTS

| | | | |
|---|---|---|---|
| 1,266,201 | 3/1972 | United Kingdom | 29/157 C |

Primary Examiner—C.W. Lanham
Assistant Examiner—Daniel C. Crane
Attorney, Agent, or Firm—J. G. Heimovics; D. S. Guttman; S. L. Epstein

[57] ABSTRACT

Fine liquid particles having about the same size are provided by an atomizer tip which includes a wall member having a plurality of generally triangular conduits passing through it. Forcing liquid through the conduits under pressure causes the liquid to exit the conduits as an accurately controlled, small droplet size spray pattern. The wall member is formed from a billet including a number of concentric tubes having in their surfaces a plurality of generally V-shaped longitudinal grooves filled with complementary filler material. This billet is constrictively reduced and sliced into discs, and then the discs are domed and the filler material is removed. The thickness of the discs corresponds to the desired thickness of the wall member. Due to doming, the conduits diverge outwardly. The atomizer tip is adapted for use as a spray nozzle which provides greater uniformity in droplet size. Specifically, the atomizer tip is adapted for use in a fuel injector for an internal combustion engine. The configuration of such a fuel injector is simplified in design because the atomizer tip may be mounted in support structure that requires a minimum of close tolerance parts.

11 Claims, 15 Drawing Figures

10 PSI VW

20 PSI VW

B

10 PSI BR

20 PSI BR

METHOD OF ATOMIZING A LIQUID, AN ATOMIZER TIP FOR USE IN THE METHOD AND METHOD OF MANUFACTURING THE TIP

BACKGROUND OF THE INVENTION

Field of the Invention

Each type of internal combustion engine is designed to burn fuel most efficiently when the droplets of fuel injected into the engine are at a preselected uniform size. For example, several engines now being manufactured burn fuel most efficiently if the droplet size of the fuel is just less than about 100 microns. Conventional fuel injectors, however, provide sprays which have droplets varying greatly from this desired size as the pressure in the fuel injector changes due to age, use and wear. Consequently, fuel is incompletely burned, increasing pollution and wasting energy.

THE INVENTION

Liquid Atomizing Method

In its broadest aspect, my invention is a novel method of atomizing liquid by forcing it under pressure through a wall member through which pass a plurality of triangular conduits for the liquid. Preferably, the wall member will be domed and the conduits will diverge outwardly. However, for some applications of my method, this may not be required.

The degree to which liquid is atomized depends mainly upon the size of the conduits and their respective orifices. In general, the smaller the orifices and the conduits, the smaller the droplet size. One feature of my method is that the pressure and conduit length may vary within limits and the droplet size will not change substantially. Consequently, this method is most advantageously employed in injecting fuel into a spark ignited internal combustion engine where it is desirable to maintain the droplet size about constant at a preselected small size even though the applied pressure varies.

The aspect ratio (length of the longest leg of the triangular orifice divided by conduit length) will to some degree also affect droplet size. Specifically, as the aspect ratio increases, the droplets tend to become larger. In general this effect is not significant. It should be noted that wall thickness, and consequently the aspect ratio, must be increased as the pressure drop across the wall increases.

Atomizer Tip

The atomizer tip of my invention provides greatly improved uniformity in droplet size. This tip may be used in fuel injectors or other liquid delivering systems when it is desirable to have a spray of uniform droplet size.

My atomizer tip includes a domed wall member having a plurality of outwardly diverging liquid conduits passing through it, and it is characterized by conduits having a generally triangular cross-sectional configuration. Preferably, the cross-sectional configuration is that of an equilateral triangle. Typically, the conduits have an aspect ratio greater than 5 and, most preferably, have an aspect ratio ranging between about 5 and about 300. The wall thickness typically will be greater than 0.005 inch, and preferably will range between about 0.02 and about 0.5 inch.

In the most preferred construction of the atomizer tip, the domed wall is in the form of a segmented sphere. In this embodiment, the walls of the conduits will, because of the method of manufacture, taper radially inwardly. The axes of the conduits will also intersect the center of the sphere, with the axis of each conduit being generally normal to a line that is tangent to the point of intersection of the conduit axis and the outer surface of the domed wall member.

The conduits terminate at the outer surface of the wall member as orifices which also have a triangular configuration. It is desirable that the triangular configuration of all the orifices be exactly triangular, but as a practical matter, the legs of the triangle usually bow slightly either inwardly or outwardly. The dimension of the longest leg of the triangular orifice ordinarily will range between 0.001 and about 0.065 inch. When the tip is used in a fuel injector, the longest leg of the triangular orifice will ordinarily have a length ranging between about 0.002 and about 0.005 inch. However, this may vary slightly depending on the engine design.

I believe that the triangular conduits provide greater uniformity in droplet size because of internal forces in the liquid stream not present in non-triangular conduits. These forces, acting at the orifices, break the effluent stream of liquid into much smaller droplets than would otherwise be attained under similar conditions in non-triangular conduits. Since the droplets are smaller, there tends to be less deviation in size. Thus, it is critical to my invention that the conduits have a triangular cross-section.

In the most preferred embodiment, the conduits will all have about equal aspect ratios and the orifices will all have about equal cross-sectional areas. Also, the orifices will be distributed in a predetermined pattern on the outer surface of the wall member. In one pattern, the orifices are arranged in a plurality of concentric annular arrays. In this pattern, orifices are spaced apart a radial dimension substantially twice the altitude of the triangular orifices, with the apexes of the triangular orifices all pointing in one direction, namely inwardly. In another pattern, the orifices are arranged so that some point outwardly, some point inwardly.

Method of Making Atomizer Tip

The atomizer tip described above may be formed by conventional procedures such as disclosed in U.K. Pat. No. 1,266,201 and U.S. Pat. No. 3,737,367 and No. 3,713,202 or by the following novel method of my invention:

First, a plurality of progressively different diameter tubular elements are machined to form on their surfaces generally V-shaped longitudinal grooves. Then complementary filler material is placed in the grooves and a billet of concentrically arranged tubular elements is formed. Preferably the billet has a central core portion. Next, the billet is transversely reduced until the filled grooves have a preselected small size. The reduced billet is then sliced or sectioned into a plurality of discs. Finally, the filler material is removed from the discs. This provides conduits in the disc having the desired triangular cross-section. Since the atomized tip has a non-flat, i.e. domed shaped, it should be domed as by coining prior to removal of the filler material. However, this method may be used to make flat structures. In this instance the doming step is both unnecessary and undersirable.

In this method, the grooves open outwardly and have a depth equal to approximately one-third the thickness of the tubular elements. Also, the central core portion is a cylindrical member having outwardly opened, generally V-shaped, longitudinal grooves similar to those of the tubular elements. The grooves in the central core also contain filler material. At the perimeter of the billet is an outer can element, free of grooves, surrounding the outermost tubular element. Preferably, the grooves are uniformly circumferentially spaced in each of the tubular elements. The tubular elements normally have an inner diameter substantially equal to the outer diameter of the next smaller tubular element in the billet.

The principal advantage of this method of making the tip is that smaller orifices of closer tolerances may be made and it is easier to control the arrangement of the orifices.

Fuel Injector

Based on my experiments, I have designed a fuel injector which utilizes my atomizer tip and liquid atomizing method. Broadly, the fuel injector includes a passage way terminating in a plenum chamber with the atomizer tip of my invention covering the plenum chamber. I have been able to obtain droplets of fuel having an average diameter of about 100 microns or less at pressures which varied over a range of from about 10 to about 40 psi when the leg of the triangular orifice was about 0.028 inch and the aspect ratio of the conduits was about 7. The standard deviation in droplet size obtained was 50 microns or less.

Because of my atomizer tip, the fuel injector will have a minimum of close tolerance parts. Specifically, the fuel injector includes a body member having a cavity which opens at one end into a port. A valve member is disposed in the cavity and has a tapered end adjacent to port. There is a valve seat at the port which has an opened conical portion in communication with the open end of the cavity. This conical portion is adapted to mate with the tapered end of the valve when the valve member is in the closed position. The only close tolerance parts are the conical portion and the tapered end of the valve which must mate together and seal off the open end of the cavity so liquid will not leak from the injector. The atomizer tip of my invention is disposed between the valve seat and the port so that the domed portion of the tip is alined with the port. Thus, when the valve member opens, liquid is ejected through the conduits of the tip and out the port.

DESCRIPTION OF THE PREFERRED EMBODIMENT

Figures 1A, 1B, 3, 4:
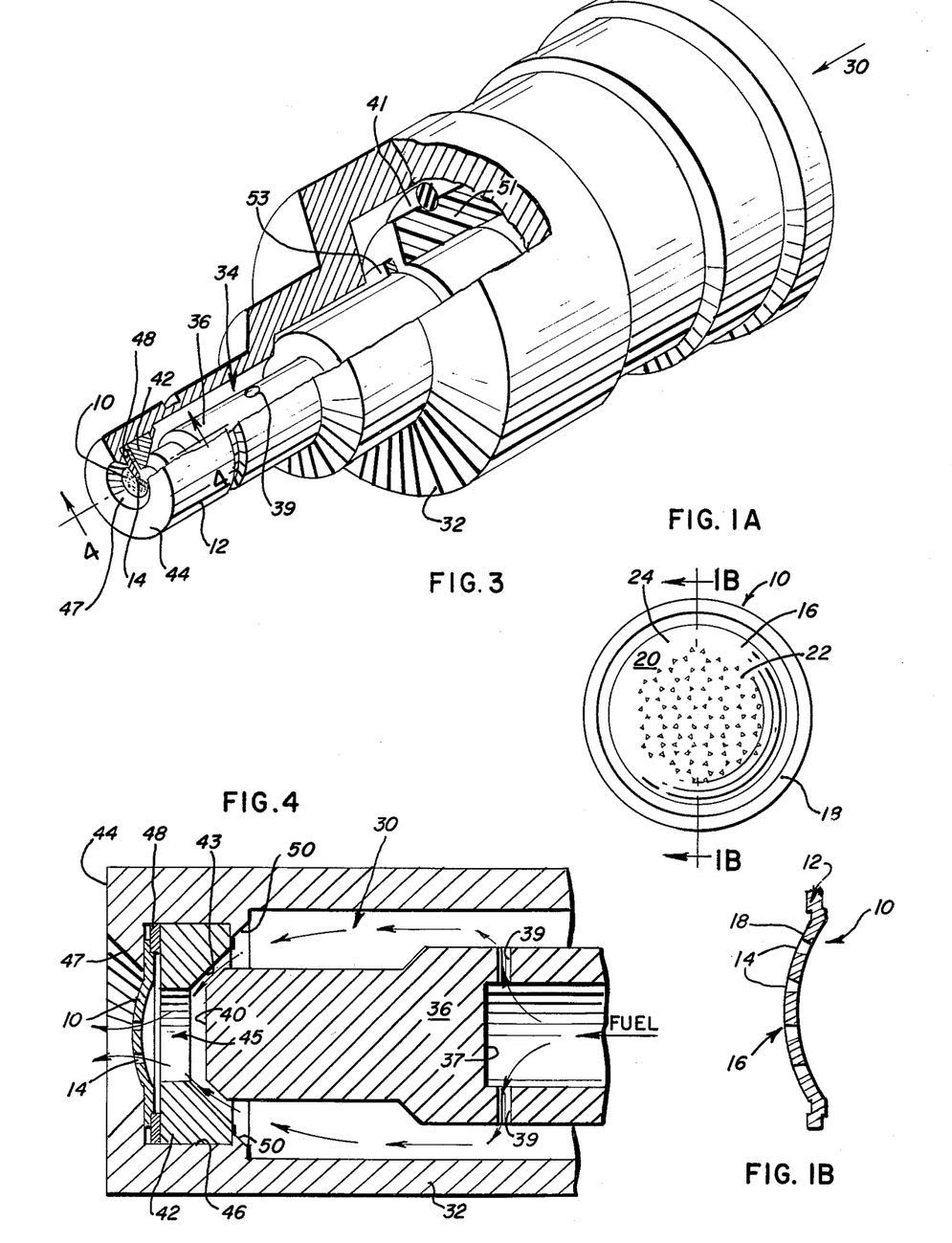
FIG. 1A is a plan view of one embodiment of the atomizer tip of my invention.
FIG. 1B is a cross-sectional view taken along line 1B—1B of FIG. 1A.
FIG. 3 is a perspective view, with sections broken away, of the fuel injector of my invention.
FIG. 4 is a cross-sectional view taken along line 4—4 in FIG. 3.
Figure 2A:
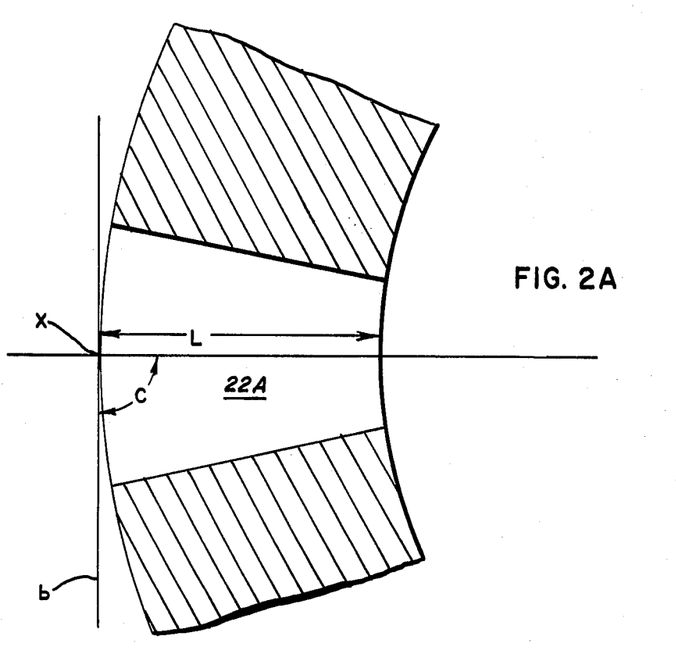
FIG. 2A is an enlarged cross-sectional view of one of the orifices in the atomizer tip shown in FIG. 1A.
Figure 2B:
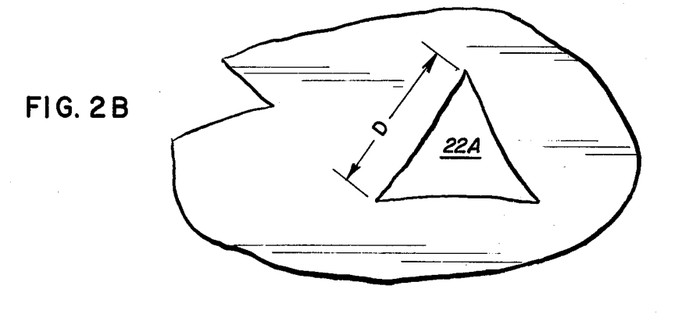
FIG. 2B is an enlarged plan view of one of the orifices of the atomizer tip shown in FIG. 1A.

As shown in FIGS. 1A, 1B, 2A, and 2B, the atomizer tip 10 of my invention includes a domed wall member 12 having diverging, triangular conduits 14 extending through it. The dome portion 16 is centrally located and surrounded by a flat annular portion 18. The conduits 14 terminate at the outer surface 20 of the wall member 12 as triangular orifices 22. These orifices 22 are arranged in a predetermined pattern, with the apexes of the orifices pointing in many different directions. As best shown in FIG. 1A, the pattern comprises groups of 6 orifices located at the tips of a Star of David. There are orifices making up one group that are also common to adjacent groups. As shown in FIG. 2B, the orifices 22 are defined by the legs of an equilateral triangle. The pattern shown in FIG. 1A can most readily be made according to the method of manufacture described in U.S. Pat. No. 3,713,202.

In the embodiment shown in FIG. 1A, all the orifices 22 have about equal cross-sectional areas but the conduits 14 taper inwardly as shown in FIG. 2A. The axis $a$ of each orifice 22 intersects a line $b$ which is tangent to the point $x$ where the axis $a$ intersects the outer surface 20 to form a right angle $c$. All the conduits 22 have an aspect ratio (L/D) equal to 7. As shown in FIG. 2B, the legs of the triangles defining the boundaries of the orifice 22A, bow slightly inwardly. This is due to the method of manufacture.

The tip 10 is mounted in the fuel injector 30 shown in FIGS. 3 and 4. This fuel injector 30 includes a body 32 having a cavity 34 which receives a valve 36 that moves between open and close positions. As best shown in FIG. 4, there is a bore 37 in the end of the valve 36 and holes 39 extend radially outward from the bore to the surface of the valve. Liquid flows through these holes 39 to fill the cavity 34, with an O-ring 41 (FIG. 3) sealing off the rear end of the cavity.

In the closed position, a spring (not shown) normally urges the valve 36 into contact with a valve seat 42 where the head 40 of the valve 36 mates with a conical opening 43 in the valve seat. This valve seat 42, together with the tip 10 and a seal 48, are disposed in a recess 46 in the nose 44 of the body 32. The seal 48 is between the underside of the tip 10 and the outer surface of the valve seat 42. The annular portion 18 of the tip 10 abuts the wall of the recess and the seal 48. The tip 10, seal 48, and valve seat 42 are held snug in position by a lip 50. The conical opening 43 terminates as a plenum chamber 45 that is coextensive with the dome portion 16. The end of the nose 44 has in it an outwardly tappering open end 47 that affords egress for the spray coming from the tip 10.

To open and close the valve 36, a coil 51 is activated by electricity. This coil 51 pulls the valve inwardly as illustrated in FIG. 4. The travel of the valve member 41 is limited by a C-washer 53 disposed within a groove on the outside of the valve body. Liquid flows out the holes 39, around the valve head 40, through the plenum chamber 45, and out the tip 10 through the triangular conduits 14. When the electric current flowing through the coil is discontinued, the spring (not shown) urges the valve 36 towards the nose 44 of the body member. This forces the tapered end or head 40 of the valve to fit snug within the conical opening 43, closing off the plenum chamber 45. The only parts which require close alighment to seal off the plenum chamber 45 are the walls of the conical opening 43 and the tapered head 40 of the valve. The tapered head 40 of the valve tends to align itself with the conical opening 43 to provide a good seal.

Figure 5:
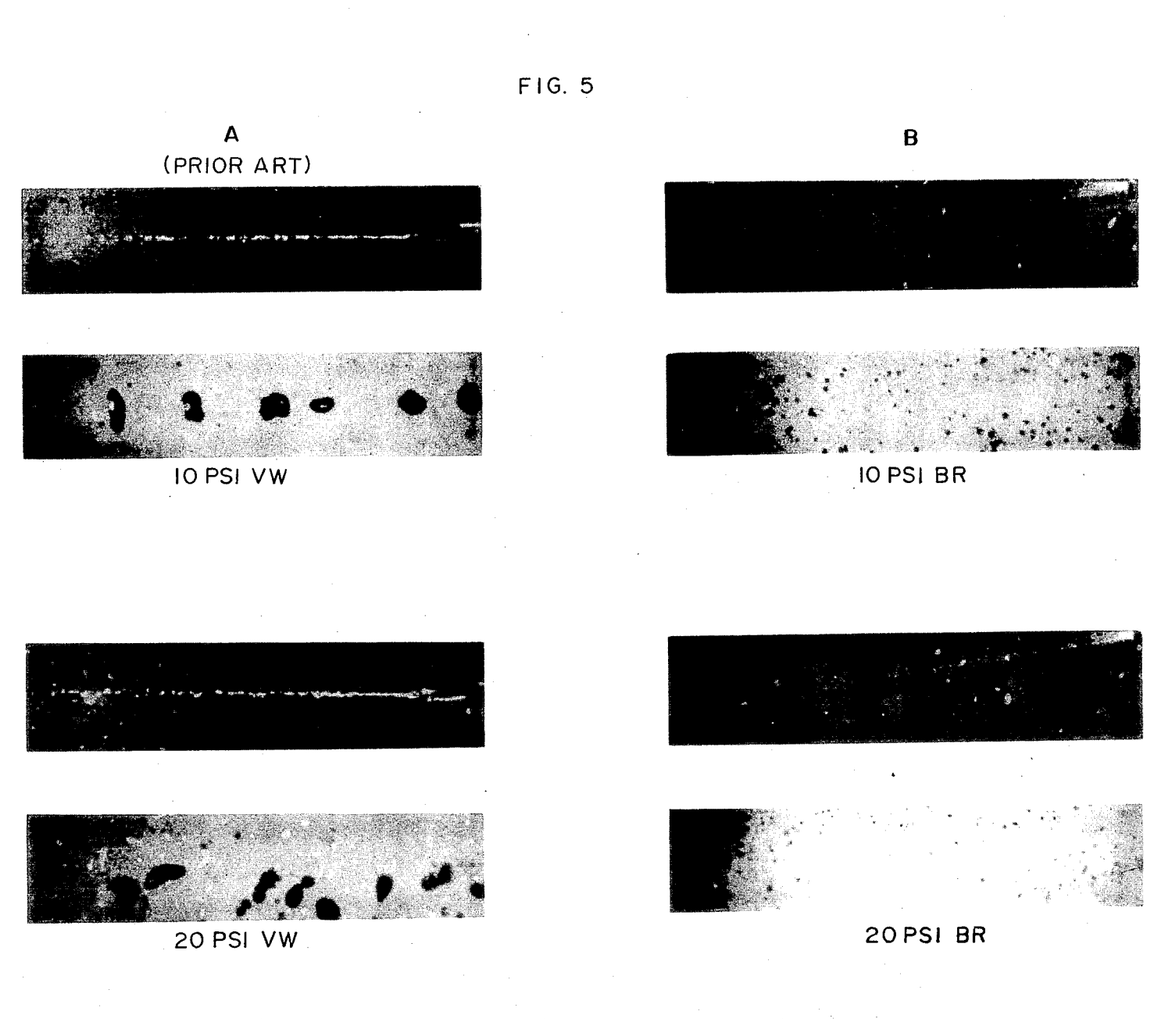
FIG. 5 is a series of photographs comparing the spray obtained from the fuel injector of my invention with the spray obtained by a prior art fuel injector.

FIG. 5 illustrates the improved atomization provided by the tip 10. Column A shows photographs of the spray and spray pattern provided by a pintel nozzle fuel injector made by Robert Bosch Co. (Germany). Column B shows photographs of the spray and spray patterns provided by the atomizer tip 10. These photographs were taken at different applied pressures but otherwise under the same conditions to show that the droplet size provided by the tip 10 remained about constant over a pressure range of from 10 to 40 psi.

Specifically, the group of photographs numbered 1–4 were taken when the applied pressure was 10 psi. Photograph 1 shows the spray from the Bosch injector, and photograph 2 shows the droplet pattern provided by this injector. Photograph 3 shows the spray provided by the atomizer tip 10, and photograph 4 shows the droplet pattern provided by the tip 10. As readily observed, when the pressure is increased the spray of the prior art tip broadens and the droplet size decreases and becomes more uniform. In contrast, the spray and the droplet pattern shown in photographs 3 and 4 is quite similar to the spray and droplet patterns shown in the other photographs in column B. In other words, using the tip 10, the spray and droplet pattern remain about constant. Consequently, when the tip 10 is used in a fuel injector, the droplets will have the desired size for best fuel economy and maintain this size even though the pressure will vary over a relatively wide range.

Method of Making Atomizer Tip

Figure 11:
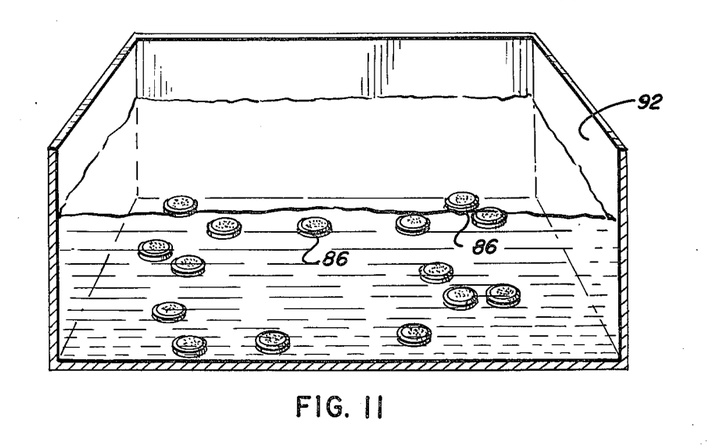
FIG. 11 illustrates the step of leaching filler material from the disc.
Figure 12:
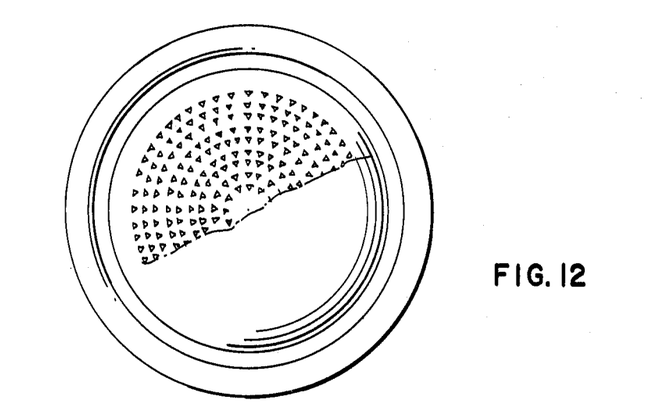
FIG. 12 is a plan view of the atomizer tip formed by the method illustrated in FIGS. 8 through 11.

FIGS. 6–11 illustrate my novel method of making the atomizer tip 60 shown in FIG. 12. This tip 60 is formed from a billet 62 made of all metallic components. Specifically it includes a plurality of concentric tubular elements 65, each having in its outer surfaces a plurality of V-shaped, longitudinal grooves 66. These elements 65 are of 300 series stainless steel. The central portion of the billet 62 is cylindrical core 64 also having a plurality of V-shaped, longitudinal grooves 66 in its outer surface. The core 64 also is of 300 series stainless steel. The perimeter of the billet 62 is defined by a can 68 comprising a thick walled tubular element free of grooves.

Figure 6:
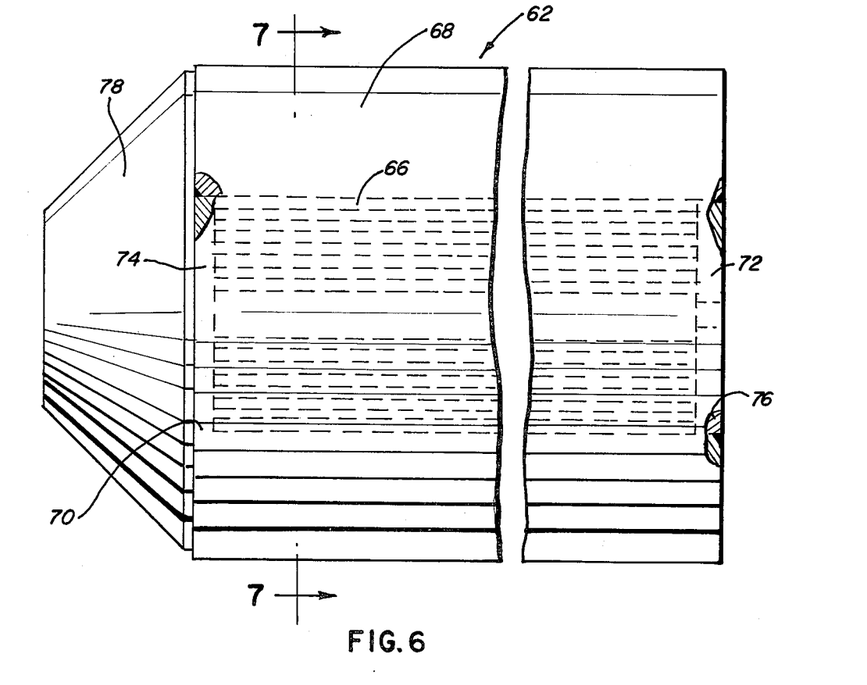
FIG. 6 is a side elevational view of a billet used in the manufacture of the atomizer tip of my invention.

As shown in FIG. 6, the can 68 has a length slightly greater than the elements 65 and core 64. Thus there is defined a cylindrical space 70 at one end of the billet 62 and another cylindrical space 72 at the opposite end. A front seal plate 74 is welded to the can 68 to close space 70 and a rear seal plate 76 is welded to the can to close space 72. A nose-piece 78 is welded to the can 68 to overlie the front end of the can and the front seal plate 76 for use in the constrictive reduction process.

Figures 8, 9, 10:
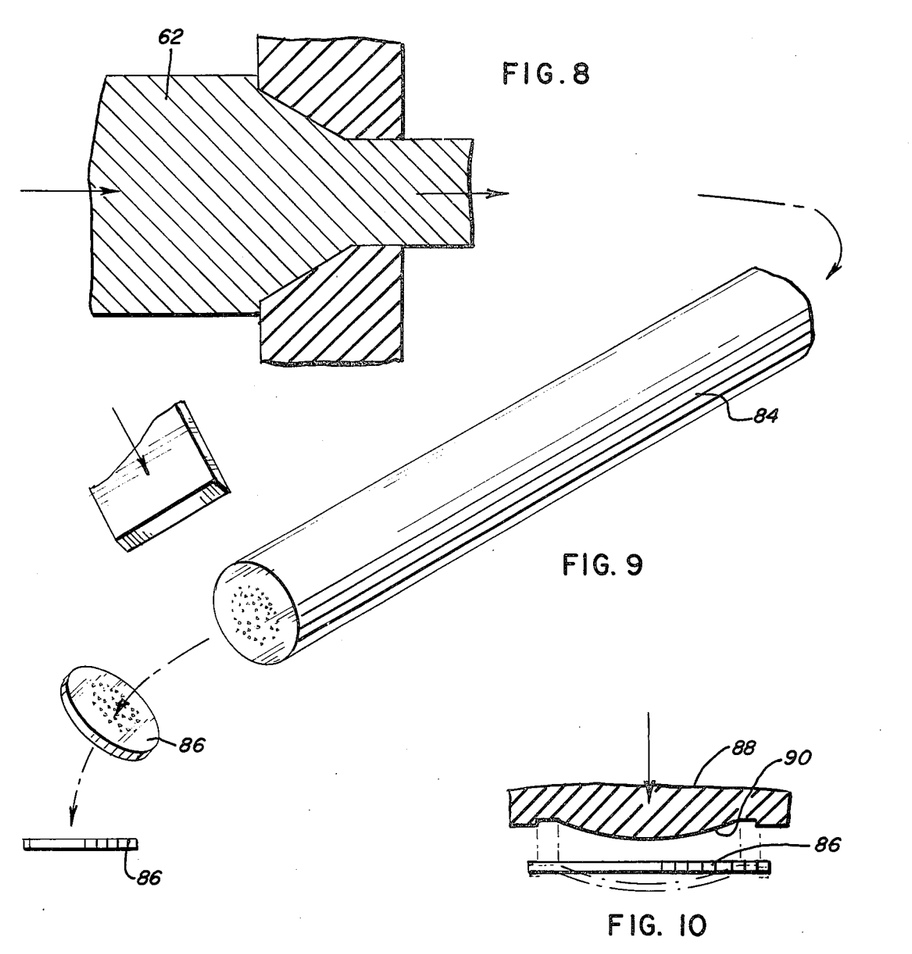
FIG. 8 is a cross-sectional view showing the step of constrictively reducing the billet shown in FIG. 6.
FIG. 9 is a perspective view illustrating the step of slicing the reduced billet.
FIG. 10 illustrates the step of doming the disc shown in FIG. 9.

As best seen in FIG. 8, each of grooves 66 comprises two legs of a substantially equilateral triangle. The third leg is defined by the inner surfaces 80 of the adjacent elements 65. Each of the grooves 66 opens outwardly with the tip of the groove directed toward the axis of the billet 62. The grooves 66 are arranged in annular arrays, being substantially equally spaced in each of the elements 65. The grooves 66 extend up to approximately half the thickness of the elements 65 so that each annular array of grooves is spaced from the adjacent annular array of grooves by a distance substantially equal to the depth of the grooves. Each of the grooves 66 is filled with a leachable filler wire 79 having a circular cross. This wire 79 is compressed into a triangular shape complementary to the grooves 66 during the reduction step. Monel 400 (low carbon) wire is preferred.

Figure 7:
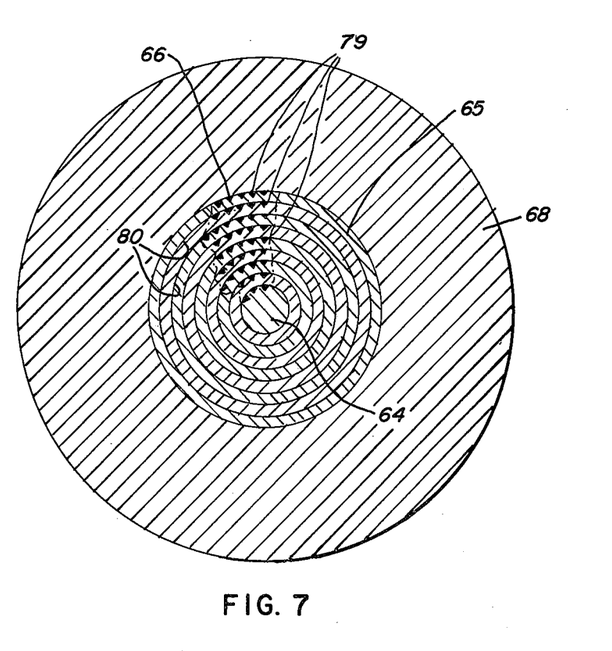
FIG. 7 is a cross-sectional view taken along line 7—7 of FIG. 6.

The outer diameter of can 68 is approximately 7 inches. Core 64 has an outer diameter of approximately 0.729 inch. Each of the elements 65 may have a thickness of approximately 0.35 inch and each of the grooves 66 have a depth of approximately 0.1 inch. The core 64 includes 12 such grooves and the elements 65 have, respectively outwardly from the core, 17, 23, 28, 34, 39, 45, 51 and 56 grooves to provide a total of 293 grooves in the billet 62.

The thusly formed billet 62 is reduced transversely by suitable reduction steps which may include initial rolling steps and subsequent drawing steps, as illustrated in FIG. 10. To provide the illustrative atomizer tip 10 discussed above the billet 62 is reduced to provide the correct orifice size. As shown in FIG. 11, the reduced stock 84 is then suitably cut or sliced into a plurality of discs 86 which, in forming the atomizer tip 10, will have a thickness of 0.02 inch. During the constructive reduction steps, V-shape of the grooves is maintained by the filler wire 79.

As shown in FIG. 10, a suitable punch 88 may be utilized to coin the discs 86 into the desired segmentally spherical configuration. The punch 88 may comprise a conventional polyethylene male punch 90. It is preferable that the wire 79 be retained in the grooves 66 during the coining operation to provide an improved support of the grooves so they maintain the desired V-shaped configuration.

Upon completion of the coining operation, the coined discs 86 are placed in a suitable leaching tank 92 (FIG. 11) containing a suitable nitric acid leach solution. This leach solution effectively leaches the wire 79 from the constricted grooves 66 to form the conduits 14.

It has been found preferable to anneal the discs 41 prior to the coining operation to aid in maintaining the triangle configuration of the conduits 14.

I claim:

1. A method of forming an atomizer tip having triangular conduits comprising the steps of:
   (a) providing a plurality of progressively different diameter tubular elements;
   (b) forming a plurality of V-shaped grooves in the outer surface of the elements;
   (c) telescopically assembling the elements, the elements being concentrically arranged and tightly packed and having an onion style cross-section;
   (d) filling the grooves tightly with non-porous sacrificial filler material;
   (e) forming a billet by placing said tubular elements with said filled grooves in an external enclosure concentrically and tightly packed;
   (f) preventing distortion of the elements and filler material during subsequent reduction thereof by insuring that the billet is void free and tightly packed;

(g) transversely reducing the billet including the filler material until the filled grooves have a preselected small size;

(h) sectioning the reduced billet into a plurality of discs; and (i) removing the filler material from said discs.

2. The method of forming an atomizer tip of claim 1 wherein the billet is provided with a central core having outwardly opening V-shaped longitudinal grooves therein filled with filler material.

3. The method of forming an atomizer tip of claim 1 wherein said grooves are outwardly opening grooves.

4. The method of forming an atomizer tip of claim 3 wherein said grooves extend into said tubular elements up to approximately one-third the thickness thereof.

5. The method of forming an atomizer tip of claim 3 wherein an outer annular element is provided concentrically about said tubular elements, said outer annular element being free of longitudinal grooves.

6. The method of forming an atomizer tip of claim 3 wherein said grooves are such that the atomizer tip will include conduits having an equilateral triangular cross-section.

7. The method of forming an atomizer tip of claim 3 wherein said grooves are uniformly circumferentially spaced in each said tubular element.

8. The method of forming an atomizer tip of claim 3 wherein said tubular elements are formed to have an inner diameter substantually equal to the outer diameter of the next smaller tubular element in said array.

9. The method of forming an atomizer tip of claim 3 wherein all of said grooves open in the same radial direction.

10. The method of forming an atomizer tip of claim 3 including the step of forming said discs to have a non-flat configuration prior to the filler removing step.

11. The method of forming an atomizer tip of claim 3 including the step of forming a dome in said discs prior to removing the filler material.

* * * * *